(12) United States Patent
Leamon et al.

(10) Patent No.: US 7,058,589 B1
(45) Date of Patent: Jun. 6, 2006

(54) METHOD AND SYSTEM FOR EMPLOYEE WORK SCHEDULING

(75) Inventors: Paul H. Leamon, McKinney, TX (US); Charles W. Gulledge, Richardson, TX (US)

(73) Assignee: IEX Corporation, Richardson, TX (US)

(*) Notice: Subject to any disclaimer, the term of this patent is extended or adjusted under 35 U.S.C. 154(b) by 0 days.

(21) Appl. No.: 09/465,690

(22) Filed: Dec. 17, 1999

Related U.S. Application Data

(60) Provisional application No. 60/112,671, filed on Dec. 17, 1998.

(51) Int. Cl.
G06Q 90/00 (2006.01)

(52) U.S. Cl. .............................. 705/9; 707/3
(58) Field of Classification Search ............... 705/9; 707/5
See application file for complete search history.

(56) References Cited

U.S. PATENT DOCUMENTS

| | | | | |
|---|---|---|---|---|
| 5,111,391 | A | * | 5/1992 | Fields et al. ................. 705/9 |
| 5,185,780 | A | * | 2/1993 | Leggett ................. 379/265.08 |
| 5,433,223 | A | * | 7/1995 | Moore-Ede et al. ........ 128/898 |
| 5,621,790 | A | * | 4/1997 | Grossman et al. ...... 379/266.08 |
| 5,848,403 | A | * | 12/1998 | Gabriner et al. ............... 706/13 |
| 5,884,307 | A | * | 3/1999 | Depledge et al. ............... 707/7 |
| 5,903,641 | A | * | 5/1999 | Tonisson ............... 379/265.12 |
| 5,911,134 | A | * | 6/1999 | Castonguay et al. ........... 705/9 |
| 6,044,355 | A | * | 3/2000 | Crockett et al. ............... 705/8 |
| 6,278,978 | B1 | * | 8/2001 | Andre et al. ................... 705/9 |
| 6,458,998 | B1 | * | 10/2002 | Spevak et al. ................. 707/1 |

FOREIGN PATENT DOCUMENTS

JP 63074558 A * 4/1998

OTHER PUBLICATIONS

Bucholtz, C., Pac Bell uses Force to cut response time, Jul. 8, 1996, Telephony, vol. 231 Issue 2, p. 7.*
Jacobs, Larry W. and Bechtold Stephen E., Microcomputer-based Workforce Scheduling, 1993, International Journal of Service Industry Management, vol. 4 No. 1, pp. 36-48. DIALOG, File 15.*

* cited by examiner

Primary Examiner—Tariq R. Hafiz
Assistant Examiner—Andre Boyce
(74) Attorney, Agent, or Firm—David H. Judson

(57) ABSTRACT

A method is provided for assigning a group of agents to a plurality of available schedules, including determining preferences for a plurality of factors for each agent. Each agent provides an order of importance for the plurality of factors. For each factor, a difference value for that factor between a preliminarily assigned schedule (or pool of unassigned schedules) and each agent's preference for that factor is determined. The difference value for each factor is assigned to a vector for each agent. Then, for each agent, a vector for each schedule not assigned to that agent is determined. Vectors for every other agent are also calculated for every schedule swap involving the current agent. The schedule having the lowest vector is then assigned for each agent.

15 Claims, 3 Drawing Sheets

METHOD AND SYSTEM FOR EMPLOYEE WORK SCHEDULING

RELATED APPLICATIONS

This application claims the benefit of U.S. Provisional Application No. 60/112,671, filed Dec. 17, 1998.

TECHNICAL FIELD

The present invention relates generally to computerized systems and methods for planning, scheduling and managing personnel in an environment in which there is a varying workload by time of day and by day of week to be staffed with a variable number of agents having varying preferences.

BACKGROUND OF THE INVENTION

Force management systems for use in planning, scheduling and managing personnel in a telephone call center are known in the prior art. Such systems typically include a basic planning capability to enable a call center supervisor to forecast future call loads and the number of agents necessary to service that load. Most prior art systems also include a simple scheduling capability which then functions to allocate agent work hours according to the staffing requirements that have been forecast. Agents are then manually or automatically assigned to fill the schedules. These systems usually also include other administrative and reporting capabilities.

An improved method and system to provide planning and scheduling is shown in Castonguay et al. (U.S. Pat. No. 5,911,134), which is assigned to the assignee of this application and incorporated herein by reference. This system provides an excellent system for automatically developing schedules to meet work flow needs. However, the system of Castonguay et al. fails to provide schedules that take into account the agent's preferences, seniority or other key criteria. It would therefore be desirable to overcome the problems associated with such prior art force management systems.

BRIEF SUMMARY OF THE INVENTION

It is an object of the invention to provide a force management system that accurately reflects the agents' preferences and seniority.

It is an additional object of the invention to provide a system that most closely fits the agent's priorities regarding their preferences so that the most valued preference is most likely to be fulfilled.

In one basic embodiment of the invention, these and other objects of the invention are provided in a method for assigning a group of agents to a plurality of available schedules, comprising determining preferences for a plurality of factors for each agent. Each agent provides an order of importance for the plurality of factors. For each factor, a difference value for that factor between a preliminarily assigned schedule (or pool of unassigned schedules) and each agent's preference for that factor is determined. The difference values for each factor are assigned to a vector for each agent wherein the factor having the highest importance is assigned to the highest order bits of the vector and the remaining factors are assigned to subsequent orders of bits in their assigned order of importance. Then, for each agent, a vector for each schedule not assigned to that agent is determined. Vectors for every other agent are also calculated for every schedule swap involving the current agent, including schedule swaps of specific factors within schedules. The schedule having the lowest vector is then assigned for each agent. Preferably, the process of assigning schedules is performed beginning with the highest ranked agent and repeated for the next highest ranked agent until all agents have been processed.

The foregoing has outlined some of the more pertinent features of the present invention. These should be construed to be merely illustrative of some of the more prominent features and applications of the invention. Many other beneficial results can be attained by applying the disclosed invention in a different manner or by modifying the invention as will be described. Accordingly, a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

Similarly referenced characters refer to similar parts or steps throughout the several views of the drawings.

DETAILED DESCRIPTION

As described above, the force management system of the present invention is adapted for planning, scheduling and managing personnel in an environment in which there is a varying workload by time of day and by day of week to be staffed with a variable number of agents. In general, the agents will be required to respond to an event load which has been forecast to occur in the future. One such environment is a telephone call center in which, for example, an "event" is an incoming call to the center. For the remainder of the description, the telephone call center environment is described only for exemplary purposes and not by way of limitation. The present invention is applicable to scheduling of a work group in any field. For example, a team of technicians providing technical support to computer owners via e-mail may advantageously apply the present invention.

To meet the varying schedule needs, schedules are initially assigned using a known system such as that described in copending U.S. patent application to Crockett et al., Ser. No. 08/890,228, which is incorporated herein by reference. Briefly, a computer database is generated including the skills, number and other criteria of the workforce. The work flow is modeled to generate a schedule of work needs. The criteria of the agents are then matched to the work needs in a "best fit" manner using a computer algorithm. In an alternative embodiment, a pool of unassigned schedules may be generated.

Preferably, the method and system of the present invention are implemented in a client-server environment where the agent and work flow databases reside on network servers and are accessible via a network to client computers on the desks of agents and managers. Many suitable computing platforms and network systems are available on the market.

Figure 1:
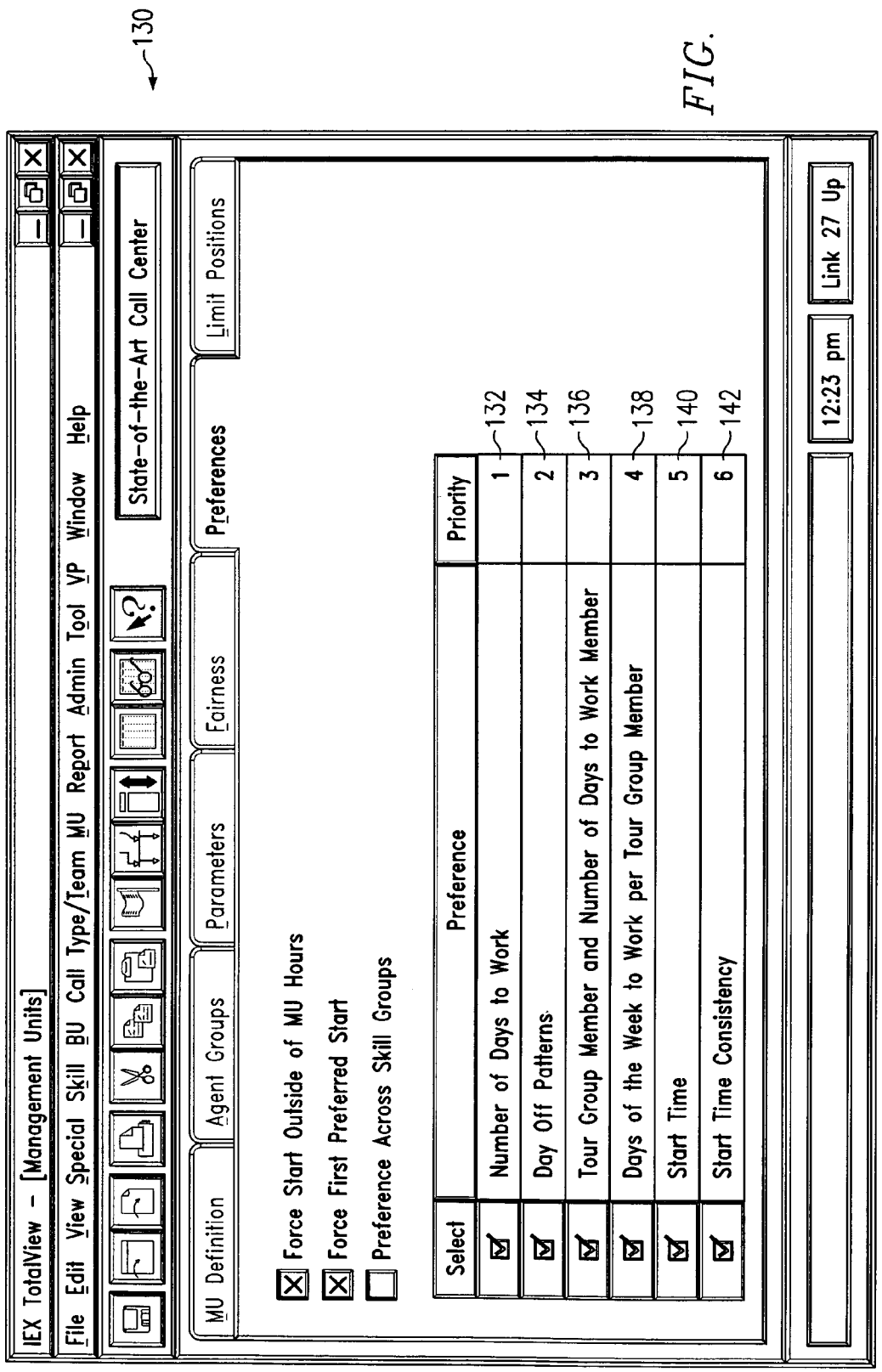
FIG. 1 is a representation of scheduling parameters screen.

Once the preliminary schedules are generated, they must be adjusted to account for the agents' preferences and the priority in which they hold those preferences. A default preference order is entered into the system by managers using screen 130, which is shown in FIG. 1. The potential preferences shown are: number of days worked 132, days off pattern 134, number of days for particular tour group member 136, which days of the week are worked for a particular tour group member 138, tour start times 140 and start time consistency 142. These particular preferences should not be considered as limiting the scope of the invention. Any criteria may be advantageously accounted for using the method and system of the present invention.

Figure 2:
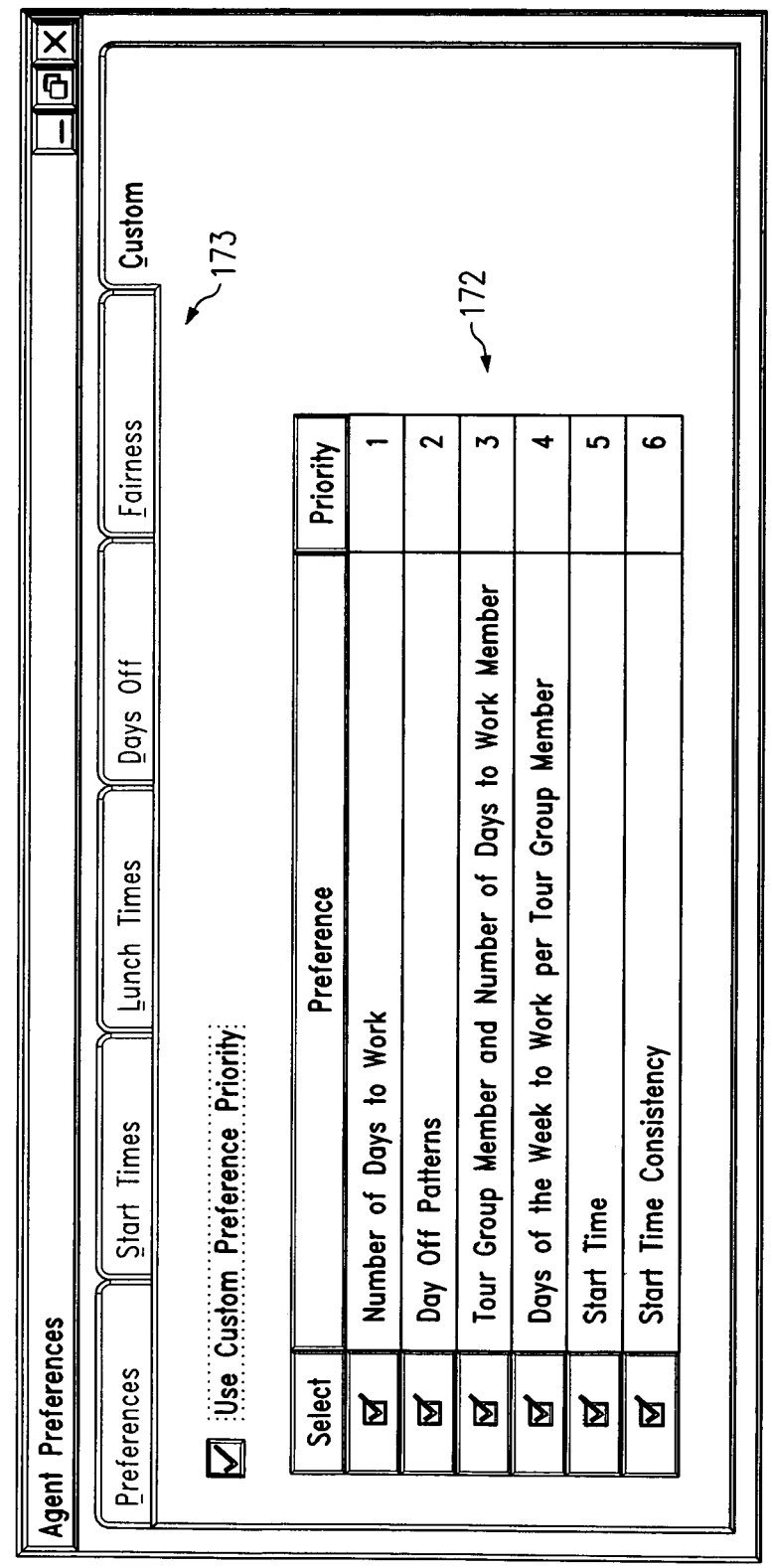
FIG. 2 is a representation of a portion of the agent preferences screen.

Priorities of the preferences are established by rank ordering the preferences and entering the ranking in screen 130. These default priorities may be overridden for each agent by management using screen 170 of FIG. 2. The rank ordered priorities are entered by management into column 172. In addition, portions of the preference screen that are not shown allow management to enter specific preferences for each agent, such as start times, break times, lunch times, days off, end time, lunch length, split shift parameters and hours worked by accessing tabs 173.

After initial schedule generation using a process such as that of Crockett et al., there are inevitably individual schedules that meet the management unit and tour (workshift) criteria, but only meet a subset of the agent's preferences. Ideally, the schedules are either wholly or partially swapped and/or are adjusted to meet each agent's preferences and priorities as closely as possible.

Figure 3:
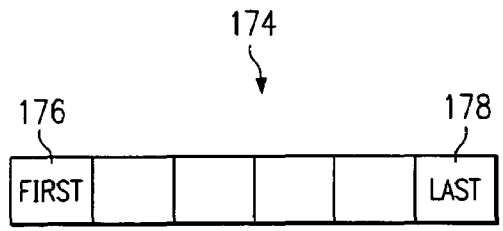
FIG. 3 is a chart show the structure of the preference fit vector.

A numerical value representing how each set of schedules fit's each agent's preference factors are compiled into a multi-word vector 174 as shown in FIG. 3. Each type of preference is assigned a bit range within the vector. The bits used in each range represent the difference (or absolute value of the difference) between the assigned schedule and the preferred schedule for each preference. For daily values, the bits assigned represent the sum of the differences for each day of the week. Where an agent has a list of preferences, the difference will be calculated specifically for each type of preference. Where an agent has no preferences, the "difference" will be either predefined or calculated specifically for each type of preferences.

The order of the bit ranges is determined by the priority ranking list provided by the agent or by default. The highest priority is assigned to highest order bit range 176. The lowest priority is assigned to lowest order bit range 178. The other priorities are place in the intervening bit ranges in order of priority. In this manner, each agent has a vector 174 that can be calculated for any schedule indicating a prioritized fit of that schedule for that agent.

Figure 4:
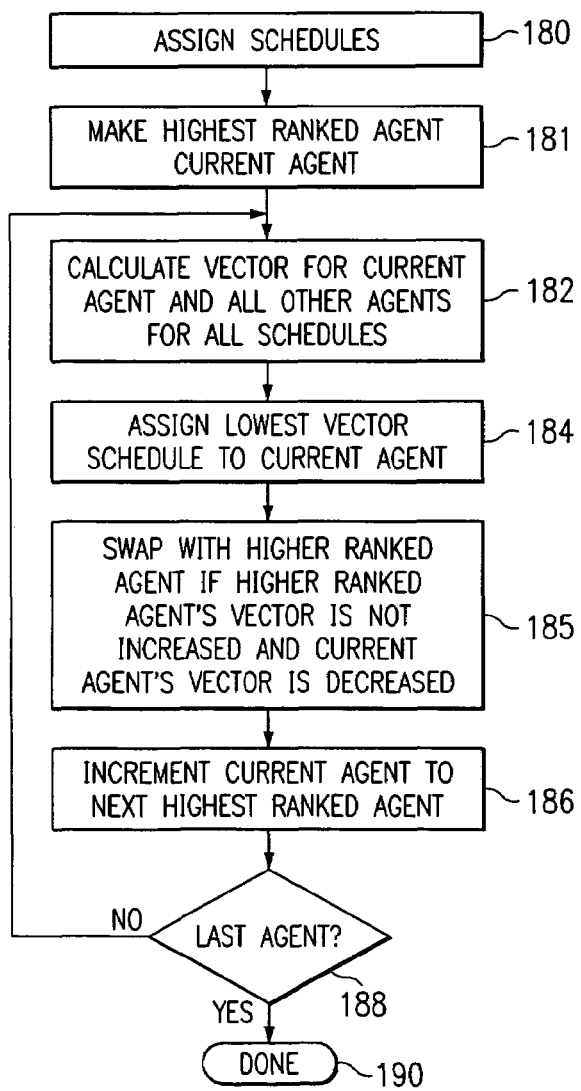
FIG. 4 is a flowchart showing the preference fit process.

The vector fit of the agents in a management unit are then processed to provide the best vector fit using the process of FIG. 4. Assigned schedules or a pool of unassigned schedules are provided using a process such as that of Crockett et al. in step 180. The agents are then ranked for processing of their schedules according to a priority system. The most common system for prioritizing processing is seniority. This embodiment will use seniority as the agent ranking scheme, but its use should not be construed as limiting the scope of the invention. Other ranking systems such as performance based systems may be used.

The process begins by making the highest ranked agent, in this example the most senior agent, the current agent for the process 181. A vector for the current agent is then calculated for every schedule. In addition, vectors for all other agents are calculated for every schedule. These procedures are shown at step 182. In addition to entire schedules, preferences within schedules may be swapped for both the current agent and all other agents to provide a closer fit. For example, an agent may have certain days off as a high priority. The system may swap particular days off to provide a schedule having a minimized vector of that agent. For each schedule assigned and for schedules with partial swaps, a vector is calculated for the current agent and all other agents. If a schedule is found where the current agent's vector is lower, the schedule is assigned to the current agent, unless the schedule is assigned to a higher ranked agent. If multiple schedules are found with lower vectors, the schedule with the lowest vector is assigned to the current agent as shown at step 184, unless the schedule is assigned to a higher ranked agent. Swapping may still occur with a higher ranked agent, but the criteria for such a swap is more stringent. A swap with a higher ranked agent can only be done if a swap can be found that will decrease the lower ranked agent's vector without increasing the vector of the higher ranked agent as shown at step 185. A pointer is then incremented to set the agent having the next highest ranking as the current agent at step 186. The process then determines if all agents have been processed at step 188. If not, the process is repeated for the next highest ranked agent. If all agents have been processed, the process is complete 190.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

The invention claimed is:

1. A computer-implemented method for automatically assigning a group of agents to a plurality of available schedules, comprising the steps of:
    determining preferences for a plurality of factors for each agent;
    assigning an order of importance for the plurality of factors for each agent, wherein the order of importance for the plurality of factors for a given agent in the group of agents differs from an order of importance for the plurality of factors for at least one other agent in the group of agents;
    determining a ranking for each agent from a highest rank to a lowest rank based on a given criteria;
    performing the following sub-steps on an iterative basis, from a highest ranked agent to a lowest ranked agent:
        (a) for each schedule that is available to be assigned to a current agent, performing the following sub-steps:
            (i) for the current agent, for each factor, determining a difference value between a current schedule and the current agent's preference for that factor;
            (ii) assigning the difference value for each factor to a bit range within a vector for the current agent and the current schedule, wherein the factor having a highest importance is assigned to a highest order bits of the vector and remaining factors are assigned to subsequent orders of bits in an assigned order of importance, wherein the vector represents a numerical value that indicates how well the current schedule fits the current agent's preferences; and
        (b) assigning to the current agent the schedule having the lowest numerical value;

wherein one or more of the steps are performed by one or more electronic processing devices.

2. The computer-implemented method of claim 1 wherein the agents are ranked according to seniority.

3. The computer-implemented method of claim 1 wherein the agents are ranked according to performance.

4. The computer-implemented method of claim 1 wherein a schedule may only be assigned from a higher ranked agent to a lower ranked agent if such assignment will decrease the lower ranked agent's vector without increasing the vector of the higher ranked agent.

5. The computer-implemented method of claim 1 wherein the plurality of factors is selected from the group of start times, break times, lunch times, days off, end time, lunch length, split shift parameters and hours worked.

6. The computer-implemented method of claim 1 wherein the plurality of schedules are preliminarily assigned schedules.

7. The computer-implemented method of claim 1 wherein the plurality of schedules are a pool of schedules.

8. A computer program product tangibly embodying computer program instructions executable by one or more electronic processing devices for performing a method that automatically assigns a group of agents to a plurality of available schedules, the method comprising:
   determining preferences for a plurality of factors for each agent;
   assigning an order of importance for the plurality of factors for each agent, wherein the order of importance for the plurality of factors for a given agent in the group of agents differs from an order of importance for the plurality of factors for at least one other agent in the group of agents;
   determining a ranking for each agent from a highest rank to a lowest rank based on a given criteria;
   performing the following sub-steps on an iterative basis, from a highest ranked agent to a lowest ranked agent:
      (a) for each schedule that is available to be assigned to a current agent, performing the following sub-steps:
         (i) for the current agent, for each factor, determining a difference value between a current schedule and the current agent's preference for that factor;
         (ii) assigning the difference value for each factor to a bit range within a vector for the current agent and the current schedule, wherein the factor having a highest importance is assigned to a highest order bits of the vector and remaining factors are assigned to subsequent orders of bits in an assigned order of importance, wherein the vector represents a numerical value that indicates how well the current schedule fits the current agent's preferences; and
      (b) assigning to the current agent the schedule having the lowest numerical value.

9. The computer program product of claim 8 wherein the agents are ranked according to seniority.

10. The computer program product of claim 8 wherein the agents are ranked according to performance.

11. The computer program product of claim 8 wherein a schedule may only be assigned from a higher ranked agent to a lower ranked agent if such assignment will decrease the lower ranked agent's vector without increasing the vector of the higher ranked agent.

12. The computer program product of claim 8 wherein the plurality of factors is selected from the group of start times, break times, lunch times, days off, end time, lunch length, split shift parameters and hours worked.

13. The computer program product of claim 8 wherein the plurality of schedules are preliminarily assigned schedules.

14. The computer program product of claim 8 wherein the plurality of schedules are a pool of schedules.

15. A computer-implemented method for automatically assigning a group of agents to a plurality of initially assigned schedules, comprising the steps of:
   determining preferences for a plurality of factors for each agent;
   assigning an order of importance for the plurality of factors for each agent;
   determining a ranking for each agent from a highest rank to a lowest rank based on a given criteria;
   performing the following sub-steps on an iterative basis, from a highest ranked agent to a lowest ranked agent:
      (a) for the current agent, for each factor, determining a difference value between a currently assigned schedule and the current agent's preference for that factor;
      (b) assigning the difference value for each factor to a bit range within an assigned vector for the current agent and the currently assigned schedule, wherein the factor having a highest importance is assigned to a highest order bits of the vector and remaining factors are assigned to subsequent orders of bits in an assigned order of importance, wherein the vector represents a numerical value that indicates how well the current schedule fits the current agent's preferences;
      (c) for each schedule that is assigned to an agent that is lower in ranking than the current agent, performing the following sub-steps:
         (i) for the current lower-ranked agent, for each factor, determining a difference value between the current lower-ranked agent's schedule and the current agent's preference for that factor;
         (ii) assigning the difference value for each factor to a bit range within a vector for the current lower-ranked agent and the current lower-ranked agent's schedule, wherein the factor having a highest importance is assigned to a highest order bits of the vector and remaining factors are assigned to subsequent orders of bits in an assigned order of importance, wherein the vector represents a numerical value that indicates how well the current lower-ranked agent's schedule fits the current agent's preferences; and
      (d) if a lower-ranked agent has a schedule with a lower numerical value than the current agent's currently assigned schedule, exchanging the schedules between those agents;
   wherein one or more of the steps are performed by one or more electronic processing devices.

* * * * *